(12) United States Patent
Hayaishi

(10) Patent No.: US 7,844,110 B2
(45) Date of Patent: Nov. 30, 2010

(54) METHOD OF PROCESSING IMAGE DATA AND APPARATUS OPERABLE TO EXECUTE THE SAME

(75) Inventor: Ikuo Hayaishi, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 952 days.

(21) Appl. No.: 11/707,398

(22) Filed: Feb. 15, 2007

(65) Prior Publication Data
US 2007/0188816 A1 Aug. 16, 2007

(30) Foreign Application Priority Data
Feb. 16, 2006 (JP) .............................. P2006-039307

(51) Int. Cl.
*G06K 9/00* (2006.01)
*G06K 9/40* (2006.01)
(52) U.S. Cl. .................... 382/167; 382/162; 382/274
(58) Field of Classification Search ................ 382/167, 382/162, 274
See application file for complete search history.

(56) References Cited

U.S. PATENT DOCUMENTS

| 6,845,181 | B2 * | 1/2005 | Dupin et al. | 382/274 |
|---|---|---|---|---|
| 6,954,549 | B2 * | 10/2005 | Kraft | 382/167 |
| 7,340,104 | B2 | 3/2008 | Fukuda | |
| 2004/0218832 | A1 * | 11/2004 | Luo et al. | 382/274 |
| 2005/0117026 | A1 | 6/2005 | Koizumi et al. | |
| 2009/0237694 | A1 | 9/2009 | Koizumi et al. | |

FOREIGN PATENT DOCUMENTS

| JP | 2000-137788 | 5/2000 |
|---|---|---|
| JP | 2004-172745 | 6/2004 |
| JP | 2004-240829 | 8/2004 |
| JP | 2004-362443 | 12/2004 |
| JP | 2005-148915 | 6/2005 |
| WO | WO 2004/100531 | 11/2004 |

OTHER PUBLICATIONS

Abstract of Japanese Patent Publication No. 2000-137788, Pub. Date: May 16, 2000, Patent Abstracts of Japan.
Abstract of Japanese Patent Publication No. 2004-172745, Pub. Date: Jun. 17, 2004, Patent Abstracts of Japan.
Abstract of Japanese Patent Publication No. 2004-362443, Pub. Date: Dec. 24, 2004, Patent Abstracts of Japan.
Abstract of Japanese Patent Publication No. 2004-240829, Pub. Date: Aug. 26, 2004, Patent Abstracts of Japan.
Abstract of Japanese Patent Publication No. 2005-148915, Pub. Date: Jun. 9, 2005, Patent Abstracts of Japan.

* cited by examiner

*Primary Examiner*—Bhavesh M Mehta
*Assistant Examiner*—Bernard Krasnic
(74) *Attorney, Agent, or Firm*—Martine Penilla & Gencarella, LLP

(57) ABSTRACT

A method and apparatus for receiving image data obtained by capturing an image. The image data is compared with a prescribed criterion for judging whether the image includes a prescribed part of a human, and a part of the image including the prescribed part of the human with a matching degree with respect to the criterion is extracted. The extracted part of the image is corrected in accordance with the matching degree to obtain corrected image data.

7 Claims, 17 Drawing Sheets

FIG. 12

| | MATCHING DEGREE |
|---|---|
| FACIAL PART A | 0.9 |
| FACIAL PART B | 0.4 |
| FACIAL PART C | 0.6 |
| FACIAL PART D | 0.7 |

METHOD OF PROCESSING IMAGE DATA AND APPARATUS OPERABLE TO EXECUTE THE SAME

CROSS REFERENCE TO RELATED APPLICATION

This application claims priority under 35 U.S.C. §119 based on Japanese Patent Application No. 2006-039307, filed Feb. 16, 2006.

BACKGROUND

1. Technical Field

The present invention relates to a technique of printing a captured image including a human.

2. Related Art

With a progress in digital technologies, an image has become possible to be simply treated in a form of image data. For example, image data can be simply generated by capturing an image using a digital camera. By providing the image data to a printing apparatus, the image can be easily printed in a full color. In addition, image data can be generated by reading the image by the use of a scanner, or using various application programs executed on a computer. Furthermore, printing technologies and image processing technologies have been improving every year. Accordingly, it has become possible to print the image with an image quality by no means inferior to a color picture printed from a film conventionally used even when the image is printed from the image data.

In general, an observer of the image tends to closely observe human faces even when the faces are just a part of the image. Therefore, when the faces are not properly presented, it gives an impression that the quality of the entire image is inferior.

Considering such a matter, Japanese Patent Publication No. 2004-240829A (JP-A-2004-240829) proposes a technique of automatically detecting the part including human faces in the image and correcting the image data to make the facial part to have an appropriate brightness. In addition, Japanese Patent Publication No. 2005-148915A (JP-A-2005-148915) proposes a technique of correcting the image data to print the facial part in a preferable skin color.

However, it is not always preferable to detect only human faces in the image with high accuracy. Therefore, there may be a problem in that the proposed techniques erroneously detect the parts other than faces and perform an inappropriate correction, thereby resulting in an unnatural image. In order to prevent such a problem, when criterion for determining whether it is the face become strict, the face may not be detected as the face and may not be corrected. Particularly, in the image includes a plurality of humans, the corrected faces and the non-corrected faces may be mixed, thereby resulting in the unnatural image.

SUMMARY

It is therefore one advantageous aspect of the invention to provide a technique capable of properly printing human faces in an image including a face which is difficult to be judged as a face.

According to one aspect of the invention, there is provided a method of processing image data, comprising:

receiving image data obtained by capturing an image;

comparing the image data with a prescribed criterion for judging whether the image includes a prescribed part of a human, and extracting a part of the image that is asserted as a part including the prescribed part of the human with a matching degree with respect to the criterion; and correcting the extracted part of the image in accordance with the matching degree to obtain corrected image data.

The extracted part of the image may be corrected with a correction amount corresponding to the matching degree.

The extracted part of the image may include a plurality of parameters adapted to be corrected. The number of parameters to be corrected may be varied in accordance with the matching degree.

The prescribed part of the human may be a face.

The parameters may include brightness and hue.

The image data may be defined by a first color space. The correcting may include converting the image data into converted data defined by a second, calorimetric color space and adapted to be the corrected image data.

The correcting may be performed in a case where the matching degree is no less than a prescribed value.

The method may further comprise generating an image based on the corrected image data.

According to one aspect of the invention, there is provided an apparatus operable to process image data, comprising:

a receiver, operable to receive image data obtained by capturing an image;

an analyzer, operable to compare the image data with a prescribed criterion for judging whether the image includes a prescribed part of a human, and to extract a part of the image that is asserted as a part including the prescribed part of the human with a matching degree with respect to the criterion; and a corrector, operable to correct the extracted part of the image in accordance with the matching degree to obtain corrected image data.

The apparatus may further comprise an image generator, operable to generate an image based on the corrected image data.

BRIEF DESCRIPTION OF THE DRAWINGS

FIG. 12 is a table for explaining a matching degree used in the image data correction.

DETAILED DESCRIPTION OF THE EXEMPLARY EMBODIMENTS

Exemplary embodiments of the invention will be described below in detail with reference to the accompanying drawings.

Figure 1:
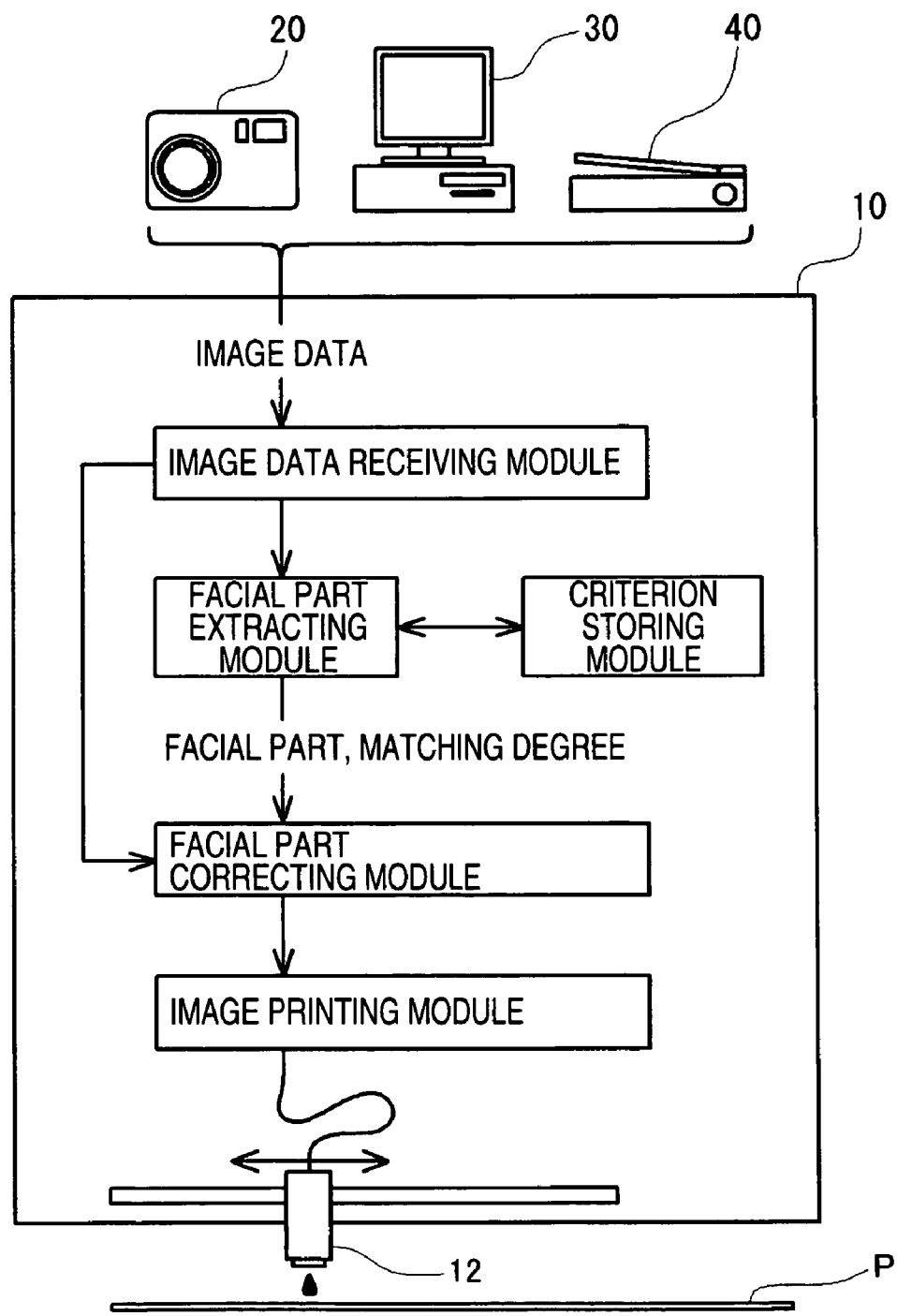
FIG. 1 is a schematic view showing a printing apparatus according to a first embodiment of the invention.

As shown in FIG. 1, a printing apparatus 10 according to a first embodiment of the invention is equipped with a printing head 12 for ejecting an ink droplet and is a so-called ink jet printing apparatus which prints an image by ejecting the ink droplet to form an ink dot, while reciprocating the printing head 12 above a printing medium P.

The image data from image apparatuses such as a digital camera 20, a computer 30, a scanner 40 or the like is received in an "image data receiving module", and then the image data is supplied in a "facial part extracting module". The "module" is formed by categorizing a series of processings that the printing apparatus 10 internally performs to print the image after receiving the image data and executing a prescribed image processing, in consideration of its function. Therefore, the module may be executed as a part of the program or executed using a logic circuit having a specific function, and may be executed in combination thereof.

In the "facial part extracting modules", an area considered to include a human face in the image (facial part) is extracted by analyzing the received image data and incorporating with a prescribed criterion. Here, the criterion is to determine whether an object included in the image is the human face and is previously stored in the "criterion storing module". The "facial part extracting module" extracts the facial part with reference to the "criterion storing module" and outputs a value (matching degree) indicating that the extracted area corresponds to the prescribed criterion to what extent. As described above, since the facial part is extracted based on the criterion, the matching degree becomes an index indicating that the extracted facial part is detected as the face to what extent of probability. The extracted facial part and the matching degree of the facial part are supplied to a "facial part correcting module".

When the "facial part correcting module" receives the image data from the "image data receiving module" and the facial part and the matching degree from the "facial part extracting module", it corrects the image data of the facial part in accordance with the matching degree. As an aspect of correcting the facial part in accordance with the matching degree, the contents for correcting the facial part may be set in advance and the amount of correction may be adjusted in accordance with the matching degree, or a plurality of categories of contents of correction may be set in advance and the categories to be corrected may be changed in accordance with the matching degree. Also, an aspect of combining these may be possible.

When the image data having the image area thus corrected is received from the "facial part correcting module", an "image printing module" drives the print head 12 in accordance with the received corrected image data and forms ink dots on a printing medium P, thereby printing the image. By doing so, the image is corrected in accordance with the matching degree even in a case where the image is difficult to determine whether the human faces are in the image. Therefore, an inappropriate correction is not performed. In addition, even when a plurality of humans is photographed, the facial parts are corrected in accordance with the matching degree. As a result, a case where the corrected face and the non-corrected face are mixed can be prevented. As described above, the printing apparatus 10 is capable of printing the image having high quality by appropriately correcting the human faces of any image. Hereinafter, the printing apparatus 10 will be described in detail with the reference to the embodiment.

Figure 2:
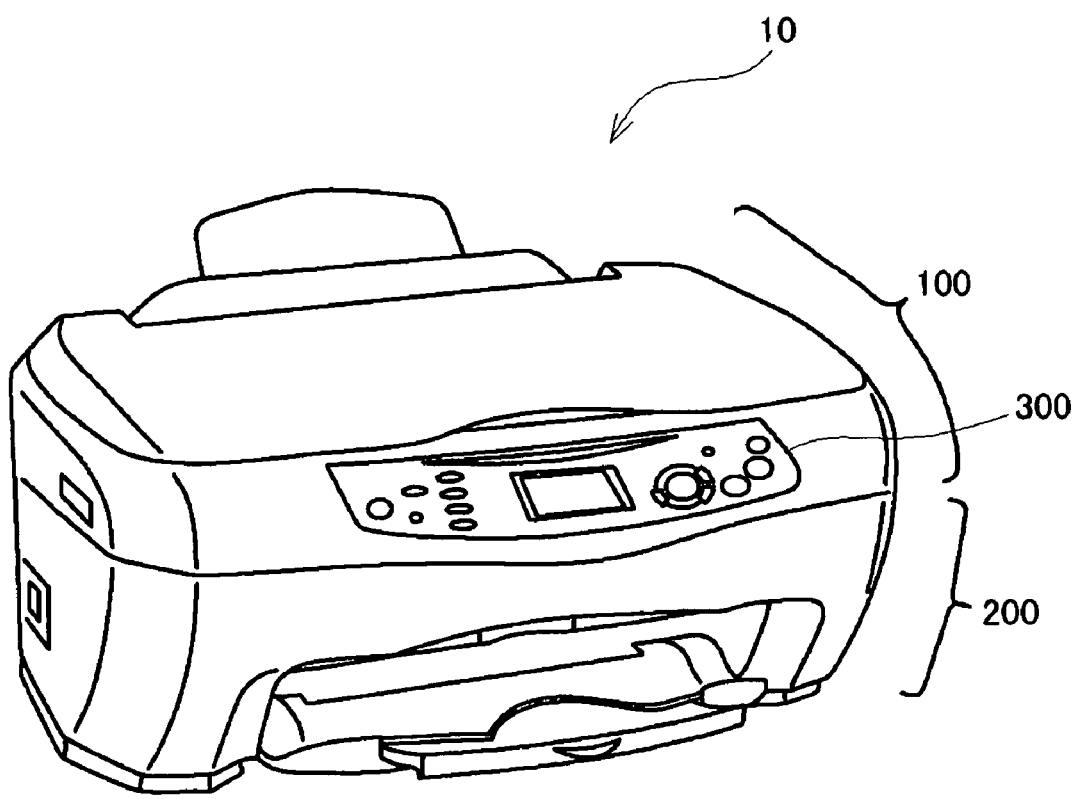
FIG. 2 is a perspective view showing an external appearance of the printing apparatus.

As shown in FIG. 2, the printing apparatus 10 of this embodiment includes a scanner section 100, a printer section 200, and a control panel 300 that controls operations of the scanner section 100 and the printer section 200. The scanner section 100 has a scanner function of reading a printed image and generating image data. The printer section 200 has a printer function of receiving the image data and printing an image on a printing medium. Further, if an image (original image) read by the scanner section 100 is output from the printer section 200, a copier function can be realized. That is, the printing apparatus 10 of this embodiment is a so-called scanner/printer/copier hybrid apparatus (hereinafter, referred to as SPC hybrid apparatus) that can solely realize the scanner function, the printer function, and the copier function.

Figure 3:
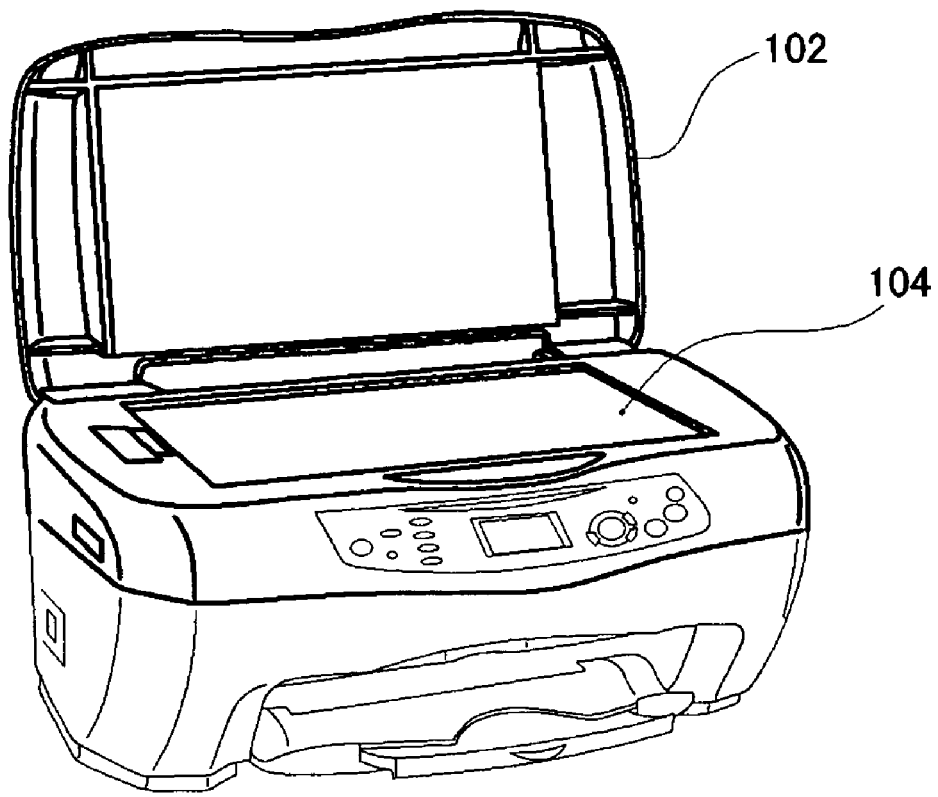
FIG. 3 is a perspective view showing a state that a table cover of the printing apparatus is opened.

As shown in FIG. 3, when a table cover 102 is opened upward, a transparent original table 104 is provided, and various mechanisms, which will be described below, for implementing the scanner function are mounted therein. When an original image is read, the table cover 102 is opened, and the original image is placed on the original table 104. Next, the table cover 102 is closed, and a button on the control panel 300 is operated. Then, the original image can be directly converted into image data.

Further, the entire scanner section 100 is housed in a case as a single body, and the scanner section 100 and the printer section 200 are coupled to each other by a hinge mechanism 204 (see FIG. 4) on a rear side of the printing apparatus 10. For this reason, only the scanner section 100 can rotate around the hinge when a front side of the scanner section 100 is lifted.

Figure 4:
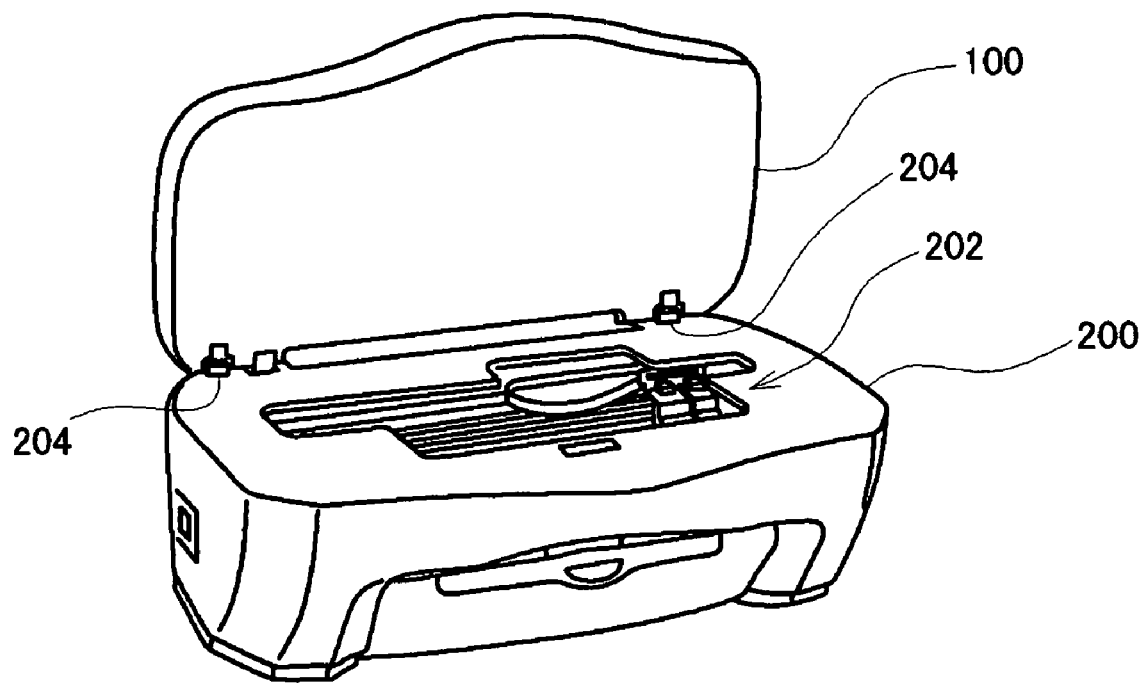
FIG. 4 is a perspective view showing a state that a scanner section of the printing apparatus is lifted up.

As shown in FIG. 4, in the printing apparatus 10 of this embodiment, when the front side of the scanner section 100 is lifted, the top face of the printer section 200 can be exposed. In the printer section 200, various mechanisms, which will be described below, for implementing the printer function, are provided. Further, in the printer section 200, a control circuit 260, which will be described below, for controlling the overall operation of the printing apparatus 10 including the scanner section 100, and a power supply circuit (not shown) for supplying power to the scanner section 100 or the printer section 200 are provided. In addition, as shown in FIG. 4, an opening portion 202 is provided on the upper face of the printer section 200, through which replacement of consumables such as ink cartridges, treatment of paper jam, and easy repair can be simply executed.

Figure 5:
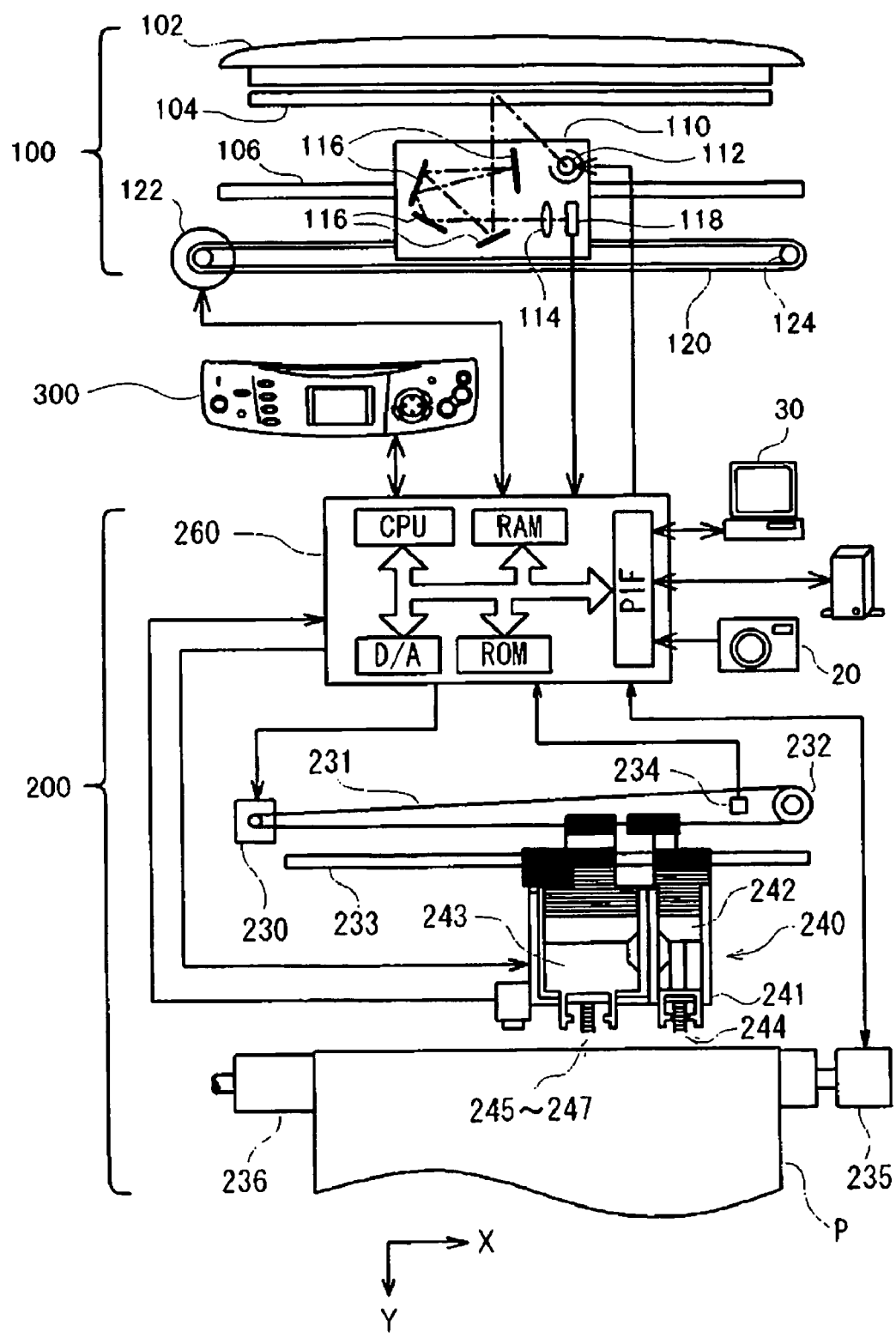
FIG. 5 is a schematic view showing an internal configuration of the printing apparatus.

Next, a description is given of the internal constructions of the scanner section 100 and the printer section 200 with reference to FIG. 5.

The scanner section 100 includes: the transparent original table 104 on which a printed original color image is set; a table cover 102 which presses a set original color image; a scanner carriage 110 for reading an original color image; a carriage belt 120 to move the scanner carriage 110 in the primary scanning direction X; a drive motor 122 to supply power to the carriage belt 120; and a guide shaft 106 to guide movements of the scanner carriage 110. In addition, operations of the drive motor 122 and the scanner carriage 110 are controlled by the control circuit 260 described later.

The scanner section 100 includes a transparent original table 104, on which a original image is set, a table cover 102 that presses the set original image, a reading carriage 110 that reads the set original image, a driving belt 120 that moves the reading carriage 110 in a reading direction (main scanning direction), a driving motor 122 that supplies power to the driving belt 120, and a guide shaft 106 that guides the movement of the reading carriage 110. Further, the operation of the driving motor 122 or the reading carriage 110 is controlled by a control circuit 260 described below.

As the drive motor 122 is rotated under control of the control circuit 260, the motion thereof is transmitted to the scanner carriage 110 via the carriage belt 120. As a result, the scanner carriage 110 is moved in the primary scanning direction X in response to the turning angle of the drive motor 122 while being guided by the guide shaft 106. Also, the carriage belt 120 is adjusted in a state that proper tension is always given thereto by an idler pulley 124. Therefore, it becomes possible to move the scanner carriage 110 in the reverse direction by the distance responsive to the turning angle if the drive motor 122 is reversely rotated.

Alight source 112, a lens 114, mirrors 116, and a CCD sensor 118 are incorporated in the interior of the scanner carriage 110. Light from the light source 112 is irradiated onto the original table 104 and is reflected from an original color image set on the original table 104. The reflected light is guided to the lens 114 by the mirror 116, is condensed by the lens 114 and is detected by the CCD sensor 118. The CCD 118 is composed of a linear sensor in which photo diodes for converting the light intensity to electric signals are arrayed in the direction orthogonal to the primary scanning direction X of the scanner carriage 110. For this reason, while moving the scanner carriage 110 in the primary scanning direction X, light of the light source 112 is irradiated onto an original color image, and the intensity of the reflected light is detected by the CCD sensor 118, whereby it is possible to obtain electric signals corresponding to the original color image.

Further, the light source 112 is composed of light emitting diodes of three colors of RGB, which is able to irradiate light of R color, G color and B color at a predetermined cycle by turns. In response thereto, reflected light of R color, G color and B color can be detected by the CCD sensor 118 by turns. Generally, although red portions of the image reflect light of R color, light of G color and B color is hardly reflected. Therefore, the reflected light of R color expresses the R component of the image. Similarly, the reflected light of G color expresses the G component of the image, and the reflected light of B color expresses the B component of the image. Accordingly, light of three colors of RGB is irradiated onto an original color image while being changed at a predetermined cycle. If the intensities of the reflected light are detected by the CCD sensor 118 in synchronization therewith, it is possible to detect the R component, G component, and B component of the original color image, wherein the color image can be read addition, since the scanner carriage 110 is moving while the light source 112 is changing the colors of light to be irradiated, strictly speaking, the position of an image for which the respective components of RGB are detected will differ corresponding to the amount of movement of the scanner carriage 110. However, the difference can be corrected by an image processing after the respective components are read.

The printer section 200 is provided with the control circuit 260 for controlling the operations of the entirety of the printing apparatus 10, a printer carriage 240 for printing images on a printing medium P, a mechanism for moving the printer carriage 240 in the primary scanning direction X, and a mechanism for feeding the printing medium P.

The printer carriage 240 is composed of an ink cartridge 242 for accommodating K ink, an ink cartridge 243 for accommodating various types of ink of C ink, M ink, and Y ink, and a head unit 241 secured on the bottom face. The head unit 241 is provided with an head for ejecting ink droplets per ink. If the ink cartridges 242 and 243 are mounted in the printer carriage 240, respective ink in the cartridges are supplied to the printing heads 244 through 247 of respective ink through a conduit (not illustrated).

The mechanism for moving the printer carriage 240 in the primary scanning direction X is composed of a carriage belt 231 for driving the printer carriage 240, a carriage motor 230 for supplying power to the carriage belt 231, a tension pulley 232 for applying proper tension to the carriage belt 231 at all times, a carriage guide 233 for guiding movements of the printer carriage 240, and a reference position sensor 234 for detecting the reference position of the printer carriage 240. If the carriage motor 230 is rotated under control of a control circuit 260 described later, the printer carriage 240 can be moved in the primary scanning direction X by the distance responsive to the turning angle. Further, if the carriage motor 230 is reversed, it is possible to cause the printer carriage 240 to move in the reverse direction.

The mechanism for feeding a printing medium P is composed of a platen 236 for supporting the printing medium P from the backside and a medium feeding motor 235 for feeding paper by rotating the platen 236. If the medium feeding motor 235 is rotated under control of a control circuit 260 described later, it is possible to feed the printing medium P in a secondary scanning direction Y by the distance responsive to the turning angle.

The control circuit 260 is composed of a ROM, a RAM, a D/A converter for converting digital data to analog signals, and further an interface PIF for peripheral devices for communications of data between the CPU and the peripheral devices, including the CPU. The control circuit 260 controls operations of the entirety of the printing apparatus 10 and controls these operations through communications of data between the light source 112, the drive motor 122 and the CCD 118, which are incorporated in the scanner section 100. Further, the control circuit 260 performs a processing for analyzing image data so as to extract a feature quantity, and a processing for correcting the image data corresponding to the feature quantity.

In addition, the control circuit 260 controls supplying drive signals to the printing heads 244 through 247 of respective colors and ejecting ink droplets while causing the printer carriage 240 to be subjected to primary scanning and secondary scanning by driving the carriage motor 230 and the medium feeding motor 235, in order to form an image on a printing medium P. The drive signals supplied to the printing heads 244 through 247 are generated by reading image data from a computer 30 and a digital camera 20, and executing an image processing described later. As a matter of course, by applying an image processing to the RGB image data read by the scanner section 100, it is possible to generate the drive signals.

Thus, under the control of the control circuit 260, ink dots of respective colors are formed on a printing medium P by ejecting ink droplets from the printing heads 244 through 247 while causing the printer carriage 240 to be subjected to the primary scanning and secondary scanning, whereby it becomes possible to print a color image. As a matter of course, instead of executing an image processing for forming the image in the control circuit 260, it is possible to drive the printing heads 244 through 247 by receiving data, which has been subjected to image processing in advance, from the computer 30 while causing the printer carriage 240 to be subjected to the primary scanning and secondary scanning in compliance with the data.

Also, the control circuit 260 is connected so as to receive data from and transmit the same to the control panel 300, wherein by operating respective types of buttons secured on the control panel 300, it is possible to set detailed operation modes of the scanner function and the printer function. Furthermore, it is also possible to set detailed operation modes from the computer via the interface PIF for peripheral devices.

Figure 6:
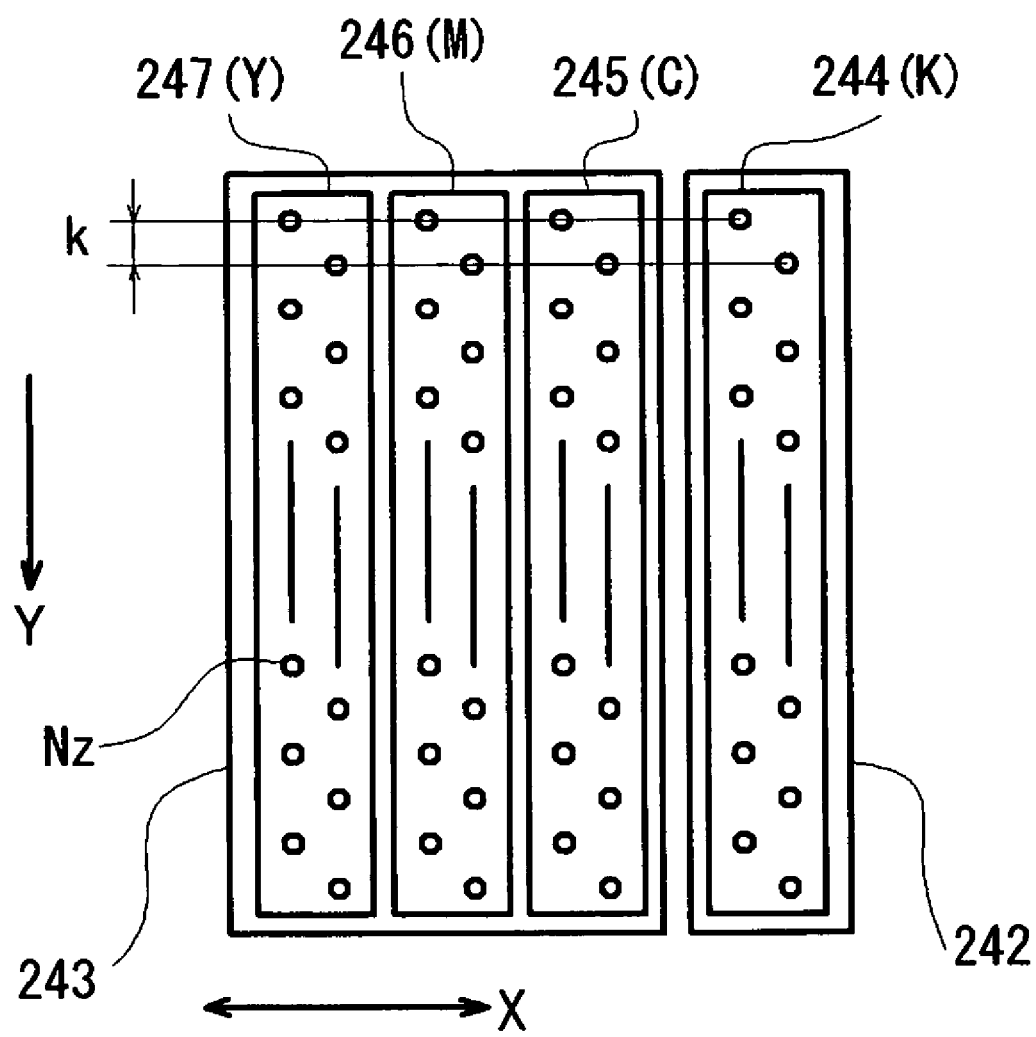
FIG. 6 is a schematic view showing nozzles of printing heads in a printing apparatus section of the printing apparatus.

As shown in FIG. 6, a plurality of nozzles Nz for ejecting ink droplets are formed on the printing heads 244 through 247 of respective colors. As shown, four sets of nozzle arrays which eject ink droplets of respective colors are formed on the bottom face of the printing heads of respective colors. In one set of the nozzle arrays, 48 nozzles Nz are arrayed in a zigzag manner with a pitch k. Drive signals are supplied from the control circuit 260 to the respective nozzles Nz, and the respective nozzles Nz eject drops of respective ink in compliance with the drive signals.

As described above, the printer section 200 of the printing apparatus 10 provides a driving signal to an ink ejecting nozzle and forms ink dots on the printing medium by ejecting ink droplets in accordance with the driving signal, thereby printing the image. In addition, control data for driving the ink ejecting nozzle is generated by performing a prescribed image processing on the image data before printing the image. Hereinafter, there will be described an image print processing in which the control data is generated by performing the image processing on the image data and the ink dots are formed in accordance with the control data thus obtained, thereby printing image.

Figure 7:
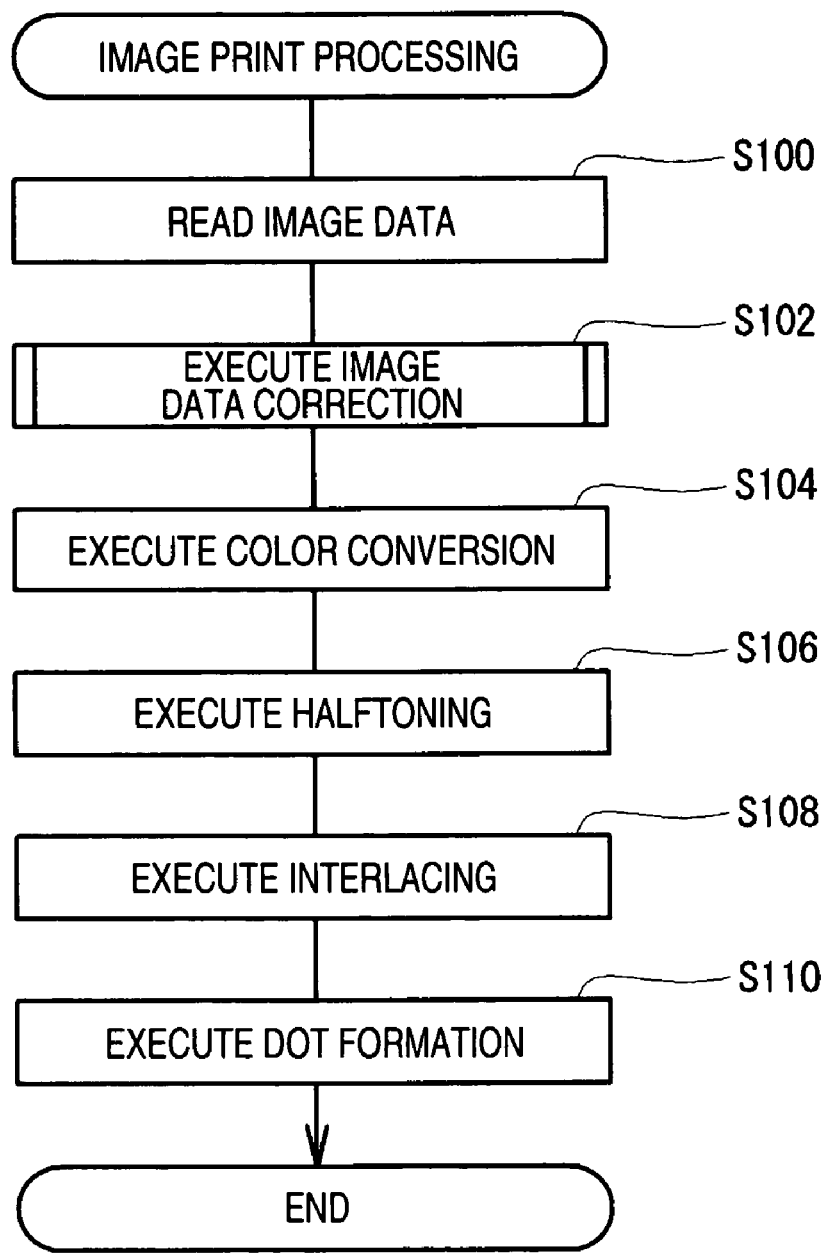
FIG. 7 is a flowchart showing an image print processing executed in the printing apparatus.

FIG. 7 shows the image print processing that is performed by the printing apparatus 10 in order to print an image. This processing is performed by the control circuit 260 mounted on the printing apparatus 10 using the internal CPU, RAM, or ROM. Hereinafter, the description will be given on the basis of the flowchart.

When an image is printed, a processing for reading image data of an image to be printed is performed at first (step S100). As the image data, image data corresponding to an image captured by the digital camera 20, image data created by various application programs working on the computer 30, and image data corresponding to an image scanned by the scanner section 100 can be used. Further, in this embodiment, each of these image data is RGB image data expressed by a grayscale value in each color of R, G and B.

Subsequently, a processing of correcting the image data thus read is performed (step S102). A detailed description thereof will be described later. In the image data correction, the received image data is analyzed, the area considered to include a human face in the image (facial part) is extracted, and a prescribed correction is performed on the facial part so that the face having further desired look is printed. In addition, for extracting the facial part, the facial part is extracted by analyzing the image data while comparing the data with the criterion set in advance and the matching degree with the criterion of the extracted facial part is output. In addition, since the prescribed correction is performed on the facial part in accordance with the matching degree for the facial part, any image data can appropriately correct the human faces. A detailed description of the image data correction will be described later.

When the image data is corrected according to the feature quantity, the control circuit 260 performs a color conversion on the obtained image data (step S104). The color conversion is a processing that converts image data into image data (CMYK image data) represented by grayscale values of respective colors including C (cyan), M (magenta), Y (yellow), and K (black). In this embodiment since the image data having been corrected by the image data correction is supplied so as to be subjected to a color conversion in a state where the image data is converted into the RGB image data, the color conversion performs a processing that converts the RGB image data into the CMYK image data. The color conversion is performed by referring to a three-dimensional numerical table that is referred to as a color conversion table (LUT).

Figure 8:
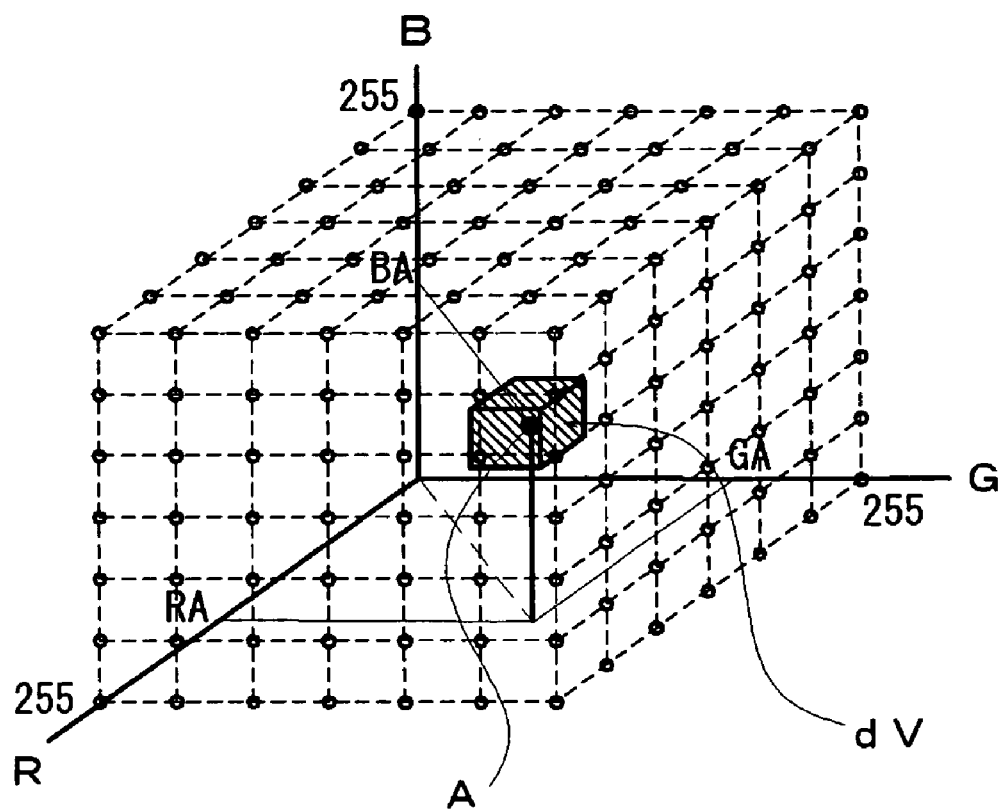
FIG. 8 is a diagram for explaining a color conversion table used in a color conversion in the image print processing.

Now, an RGB color space is taken into account, in which grayscale values of respective colors of R, G and B are taken in three axes orthogonal to each other as shown in FIG. 8, and it is assumed that the grayscale values of respective colors of RGB take values from 0 through 255. If so, all the RGB image data can be associated with an internal point of a cube (color solid), the original point of which is the top and the length of one side of which is 255. Therefore, changing the view point, if a plurality of lattice points are generated in the RGB color space by fragmenting the color solid in the form of a lattice orthogonal to the respective axes of RGB, it is considered that respective lattice points correspond to the RGB image data respectively. Therefore, combinations of grayscale values corresponding to the use amounts of ink of respective colors of C, M, Y and K are stored in advance in the respective lattice points. Thereby, the RGB image data can be quickly converted to image data corresponding to the use amounts of respective colors of ink (CMYK image data) by reading the grayscale values stored in the lattice points.

For example, if it is assumed that the R component of the image data is RA, the G component thereof is GA and the B component thereof is BA, the image data are associated with the point A in the RGB color space. Therefore, a cube dV having the point A included therein is detected from minute cubes which is fragmented from the color solid, the grayscale values of respective colors of ink, which are stored in the respective lattice points of the cube dV, are read. And, it is possible to obtain the grayscale value of the point A by executing an interpolation calculation based on the grayscale values the respective lattice points. As described above, it can be considered that the look-up table (LUT) is a three-dimensional numerical table in which combinations of grayscale values corresponding to the use amounts of ink of respective colors of C, M, Y and K are stored in a plurality of lattice points established in the RGB color space. And, by referencing the look-up table, it is possible to quickly convert the RGB image data in terms of color.

After the color conversion is terminated as described above, a halftoning is executed in the image copy processing shown in FIG. 7 (Step S106). The gradation data corresponding to the use amounts of ink of respective colors of CMYK obtained by the color conversion are data which can take a value from the grayscale value 0 through the grayscale value 255 per pixel. To the contrary, in the printer section 200, the printer section takes only a status on whether or not a dot is formed, with attention directed to individual pixels since the printer section 200 prints an image by forming dots. Therefore, it is necessary to convert the CMYK gradation data having 256 gradations to data (dot data) showing whether or not a dot is formed per pixel. The halftoning is a processing for converting the CMYK gradation data to dot data.

As a method for executing the halftoning, various types of methods such as an error diffusion method and a dither method may be employed. The error diffusion method diffuses the error in gradation expression generated in a certain pixel, by judging whether or not dots are formed in regard to the pixel, to the peripheral pixels, and at the same time, judges whether or not dots are formed in regard to respective pixels, so that the error diffused from the periphery can be dissolved. Also, the dither method compares the threshold values set at random in a dither matrix with the CMYK gradation data per pixel, and, for pixels in which the CMYK gradation data are greater, judges that dots are formed, and for pixels in which the threshold value is greater, judges that no dot is formed, thereby obtaining dot data for the respective pixels.

Figure 9:
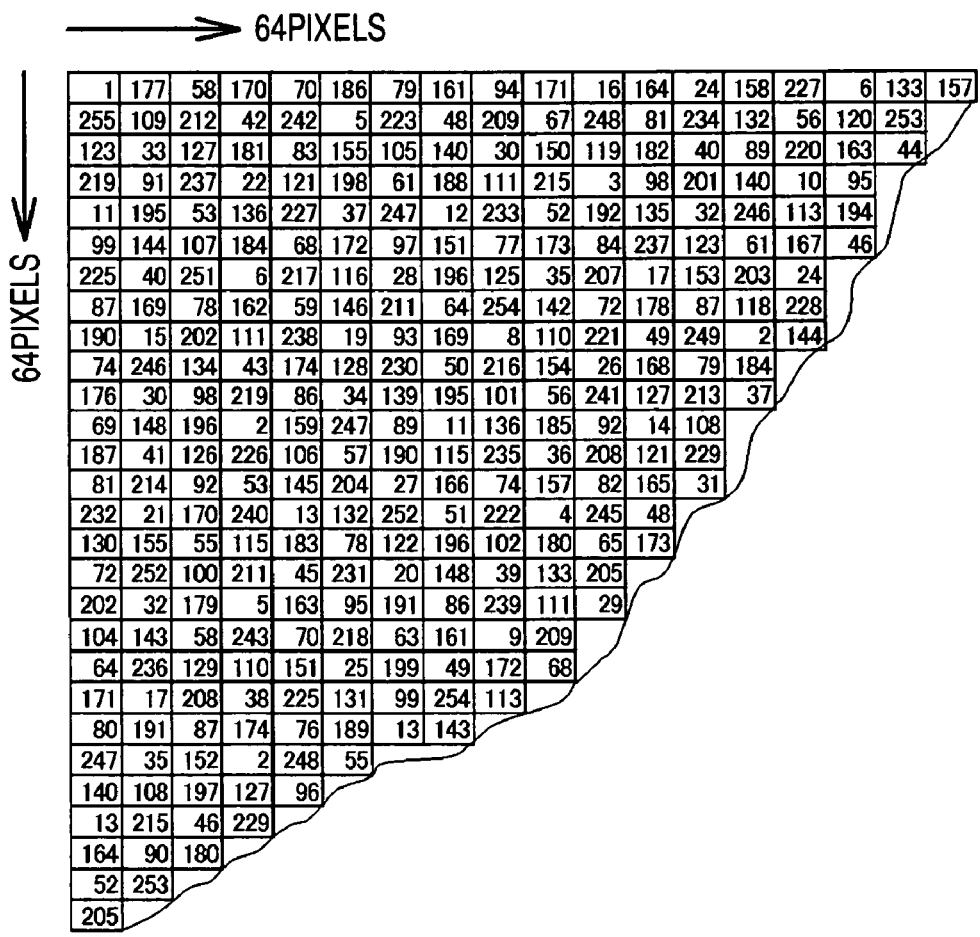
FIG. 9 is a diagram showing a part of a dither matrix used in a halftoning in the image print processing.

FIG. 9 shows a part of the dither matrix. In the illustrated matrix, threshold values universally selected from the range of the grayscale values 0 through 255 are stored at random in 4096 pixels consisting of 64 pixels disposed in both the vertical and horizontal directions. Herein, the reason why the grayscale values of the threshold values are selected in the range of 0 through 255 corresponds to that the CMYK image data is of 1 byte in the embodiment, and the grayscale value takes a value from 0 through 255. In addition, the size of the dither matrix is not limited to 64 pixels in both the vertical and horizontal directions as shown in FIG. 9, but may be set to various sizes including a case in which the number of pixels differs in the vertical and horizontal directions.

Figure 10:
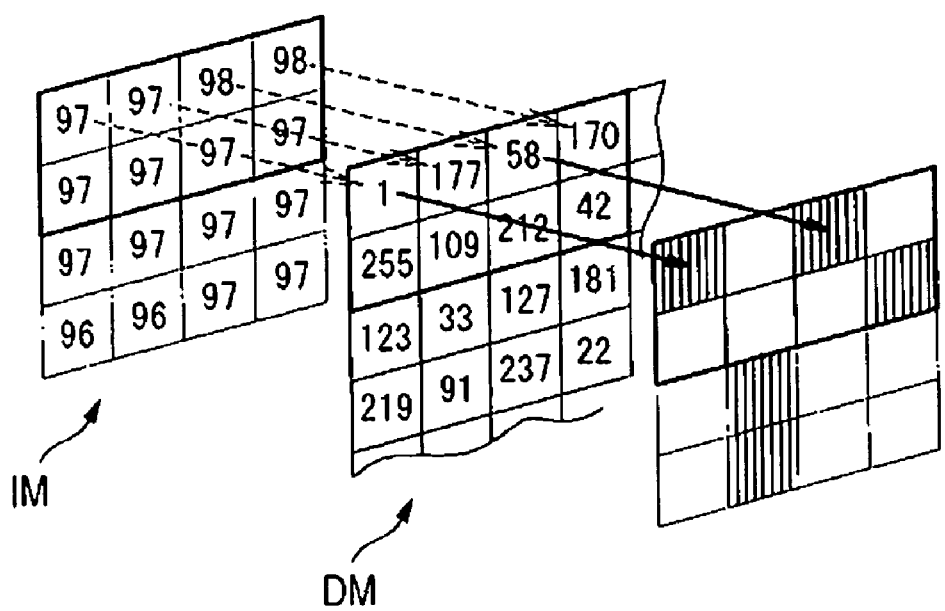
FIG. 10 is a diagram showing how to judge whether dots are formed for each pixel with reference to the dither matrix.

FIG. 10 shows how to judge whether or not dots are formed per pixel with reference to the dither matrix. Such judgment is made for respective colors of CMYK. However, hereinafter, to avoid complicated description, the CMYK image data are handled merely as image data without distinguishing respective colors of the CMYK image data.

When judging whether or not dots are formed, first, the grayscale value of the image data IM for a pixel to which attention is focused as an object to be judged, (pixel of interest) is compared with the threshold value stored in the corresponding position in the dither matrix DM. The arrow of a dashed line, which is shown in the drawing, schematically expresses that the image data of the noted pixel are compared with the threshold value stored in the corresponding position in the dither matrix. Where the image data of the noted image is greater than the threshold value of the dither matrix, it is judged that a dot is formed for the pixel. To the contrary, where the threshold value of the dither matrix is greater than the other, it is judged that no dot is formed for the pixel. In the example shown in FIG. 10, the image data of the pixel located at the left upper corner of the image is "97", and the threshold value stored in the position corresponding to the pixel in the dither matrix is "1". Therefore, since, on the pixel located at the left upper corner, the image data are greater than the threshold value of the dither matrix, it is judged that a dot is formed for the pixel. The arrow of a solid line shown in the FIG. 10 schematically expresses the state that the result of judgment is written in a memory upon judging that a dot is formed.

On the other hand, in regard to a pixel adjacent to this pixel at the right side, the image data are "97", and the threshold value of the dither matrix is "177", wherein the threshold value is greater than the other. Therefore, it is judged that no dot is formed. Thus, by comparing the image data with the threshold value set in the dither matrix, it is possible to determine, at respective pixels, whether or not dots are formed. In the halftoning (Step S106 in FIG. 7), the above-described dither method is applied to the gradation data corresponding to the use amounts of respective ink of C, M, Y and K, whereby the processing of generating dot data is executed while judging, for each of the pixels, whether or not dots are formed.

After the gradation data of the respective colors of CMYK are converted to dot data, an interlacing is executed (Step S108). The interlacing re-arranges the dot data in the order along which the head unit 241 forms dots, and supplies the data to the printing heads 244 through 247 of the respective colors. That is, as shown in FIG. 6, since the nozzles Nz secured at the printing heads 244 through 247 are provided in the secondary scanning direction Y with the interval of nozzle pitch k spaced from each other, if ink drops are ejected while causing the printer carriage 240 to be subjected to primary scanning, dots are formed with the interval of nozzle pitch k spaced from each other in the secondary scanning direction Y. Therefore, in order to form dots in all the pixels, it is necessary that the relative position between the head 240 and a printing medium P is moved in the secondary scanning direction Y, and new dots are formed at pixels between the dots spaced only by the nozzle pitch k. As has been made clear from this, when actually printing an image, dots are not formed in the order from the pixels located upward on the image. Further, in regard to the pixels located in the same row in the primary scanning direction X, dots are not formed by one time of primary scanning, but dots are formed through a plurality of times of primary scanning based on the demand of the image quality, wherein it is widely executed that dots are formed at pixels in skipped positions in respective times of primary scanning.

Thus, in a case of actually printing an image, since it does not mean that dots are formed in the order of arrangement of pixels on the image, before actually commencing formation of dots, it becomes necessary that the dot data obtained for each of the colors of C, M, Y and K are rearranged in the order along which the printing heads 244 through 247 form the same. Such a processing is called an "interlacing."

After the interlacing is completed, a processing of actually forming dots on a printing medium P (dot formation) is executed by the control circuit 260 based on the data obtained by the interlacing (Step S110). That is, while causing the printer carriage 240 to be subjected to primary scanning by driving the carriage motor 230, the dot data (printing control data) whose order has been rearranged are supplied to the printing heads 244 through 247. As a result, the ink droplets are ejected from the ink ejection heads 244 through 247 according to the dot data indicative of whether a dot is formed in each pixel, so that the dots are appropriately formed at each pixel.

After one time of primary scanning is completed, the printing medium P is fed in the secondary scanning direction Y by driving the medium feeding motor 235. After that, again, the dot data (printing control data) whose order has been rearranged are supplied to the printing heads 244 through 247 to form dots while causing the printer carriage 240 to be subjected to primary scanning by driving the carriage motor 230. By repeating such operations, dots of respective colors of C, M, Y and K are formed on the printing medium P at a proper distribution responsive to the grayscale values of the image data. As a result, the image is printed.

As described above, in the image print processing according to the present embodiment, when the image data is received, the area (facial part) considered as including the human face is extracted and corrected to give the face a more desirable look. In this case, an index corresponding to a reliability of the facial part (that is, to what extent of certainty, it is considered as the face) is obtained and the area is corrected in accordance with a certainty. Therefore, when it difficult to determine whether the image includes at least one human face, the face is appropriately corrected so that a preferred image can be printed. Hereinafter, a processing of extracting and correcting the facial part in the image (image data correction) will be described in detail with reference to FIG. 11.

As described above with reference to FIG. 7, such as a processing is performed by the control circuit 260 when the image data to be printed is received.

Figure 11:
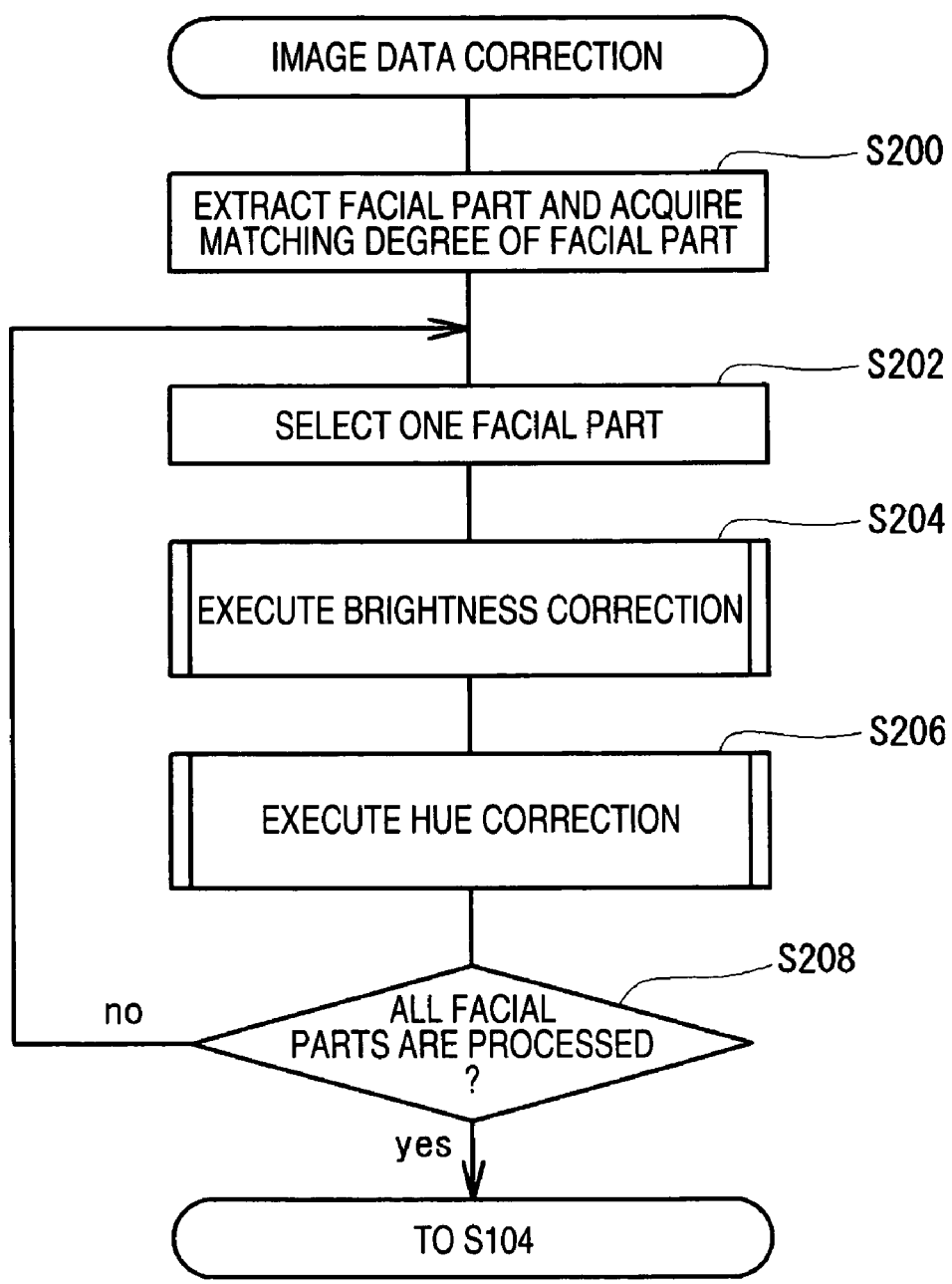
FIG. 11 is a flowchart specifically showing an image data correction in the image print processing.

As shown in FIG. 11, when the image data correction is stared, first, the image data is analyzed to extract the facial part, and a processing of acquiring the matching degree of the facial part is performed (step S200). As described above, the facial part is the area considered to include the human face in the image. There are proposed various methods as a method for extracting the facial part from the image. Briefly speaking, such methods extract the part corresponding to the face, depending on whether it matches with the prescribed criterion. In the embodiment, any methods can be employed and the facial part can be extracted by the following method as an example.

First, in the image data, the part corresponding to a contour of the object is extracted. For extracting the contour, noise is removed by the use of a two-dimensional filter such as a median filter, or contrast or edge is emphasized, and then the image data is binarized. The boundary of the binarized image thus obtained is extracted as the contour of the object. Then, the part considered that it is definitely not the face is excluded among the extracted contour. For example, the object with a high straight line ratio among the extracted contour is so-called an artificial object. As described above, the object which cannot be definitely determined that it is not the human face is excluded.

In consideration of a formation of the contour among the remained objects, objects considered as an "eye", a "mouth", and a "nose" are extracted. A method which is so-called a pattern matching method can be employed to extract the "eye", the "mouth", and the "nose". From the pattern matching method, there are acquired values which indicate to what extent of certainty the objects are determined as the "eye", the "mouth", and the "nose", respectively (matching degree to the eye, the lip, and the nose).

When the extracted objects are the "eye", the "mouth", and the "nose", these have a prescribed positional relation. For example, when the object considered as the "mouth" is extracted and the object considered as the "eye" or the "nose" (or, an object which can be definitely determined as the "eye" or the "nose") exists in an appropriate range in an upper direction, the extracted object can be determined as the "mouth". Similarly, when the object considered as the "eye" is really the "eye", there exists an object like the "eye" in the same direction nearby. Accordingly, by extracting the objects considered as the "eye", the "mouth", and the "nose" from the contour and by considering the positional relation between the extracted objects, the "eye", the "mouth", and the "nose" can be specified. In addition, the matching degrees for the "eye", the "mouth", and the "nose" are adjusted whether to what extent the positional relation between the "eye", the "mouth", and the "nose" corresponds to the standard positional relation, for example, whether to what extent the position of the "mouth" corresponds to the standard position on the basis of the position of the "eye".

Finally, by extracting the contour part of the face which includes a set of the "eye", the "mouth" and the "nose", the area considered to include the human face in the image (facial part) is extracted. In this case, by adding the matching degree for the "eye", the "mouth" and the "nose" included in the extracted facial part the matching degree for the facial part is calculated. The matching degree thus obtained can be used as an index indicating whether to what extent the extracted area is considered as the face.

In the above description, the matching degree of a total facial part is obtained by accumulating the matching degrees for each of the elements such as the "eye", the "mouth" and the "nose", or the matching degree for the positional relation of each element. However, the total matching degree may not be obtained by accumulating the individual matching degrees, but may be obtained after extracting the facial part. That is, by previously storing the standard facial image and calculating a two-dimensional correlation coefficient between the facial image stored after extracting the facial part and the extracted facial part, the obtained correlation coefficient may become the matching degree.

As shown in FIG. 12, the matching degree has a value in the range of 0 to 1. For example, the facial part A has a matching degree of 0.9, which means that the extracted area is almost certainly a human face. On the contrary, the facial part B has a matching degree of 0.4 and it is difficult to determine whether the extracted area is a human face. The facial part B cannot be concluded as a human face but rather means an image not considered as a human face. In addition, the facial part C has a matching degree of 0.6, which means the extracted area may be considered as a human face but may not be considered as a human face.

In a conventional facial part extraction, the image such as the facial part B is not often extracted as the facial part and the image such as the facial part C is often extracted as the facial part. However, in this embodiment, since the facial part is extracted together with the matching degree, a doubtful area such as the facial part B is also extracted as the facial part. In step S200 of FIG. 11, the facial part and the matching degree thereof are extracted from the image data as described above.

Next, one facial part to be corrected is selected if a plurality of facial parts are extracted (step S202). Next, a processing of correcting brightness of the facial part (brightness correction) is performed in accordance with the matching degree of the selected facial part (step S204).

Figure 13:
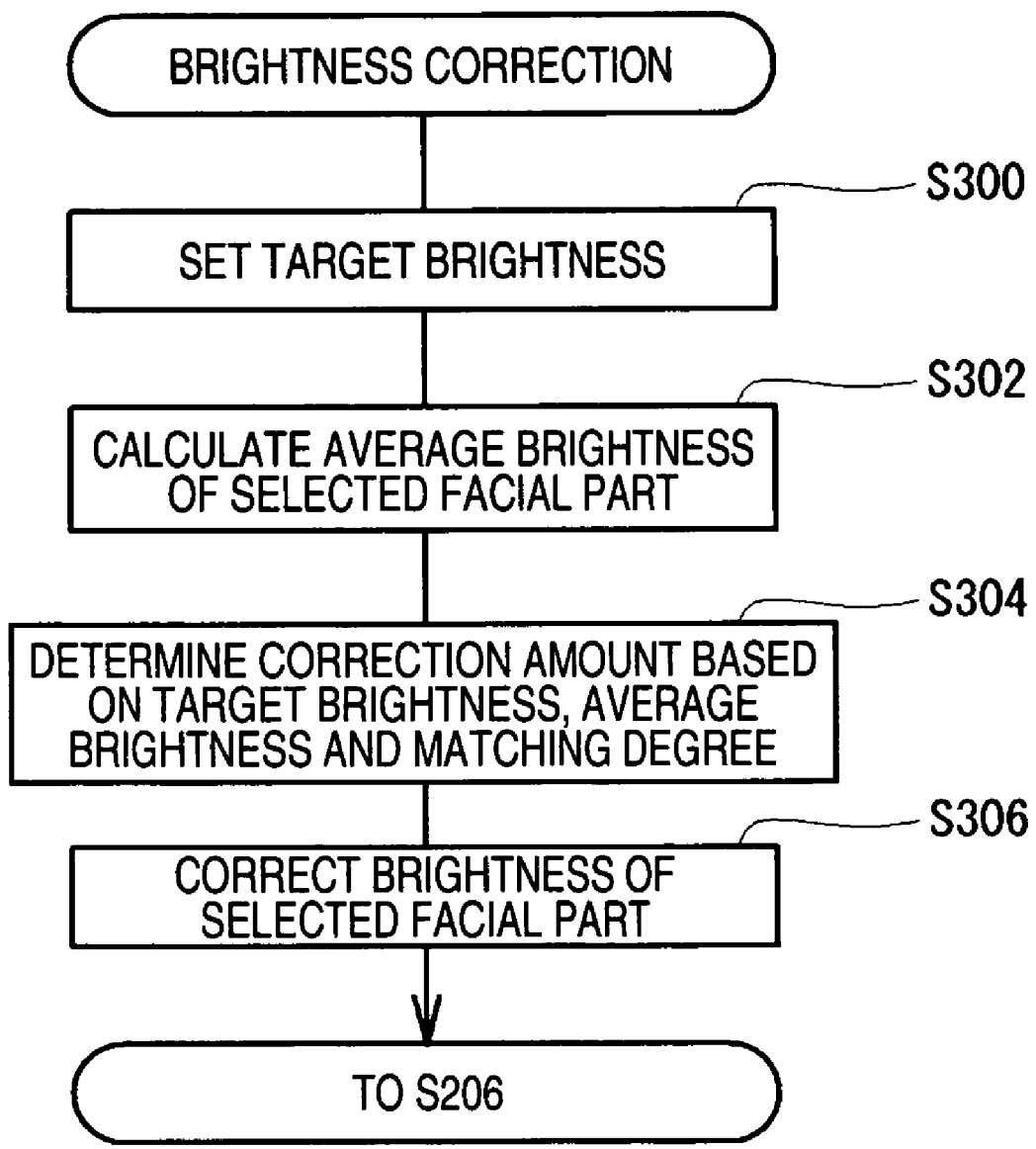
FIG. 13 is a flowchart specifically showing a brightness correction in the image data correction.
Figure 14:
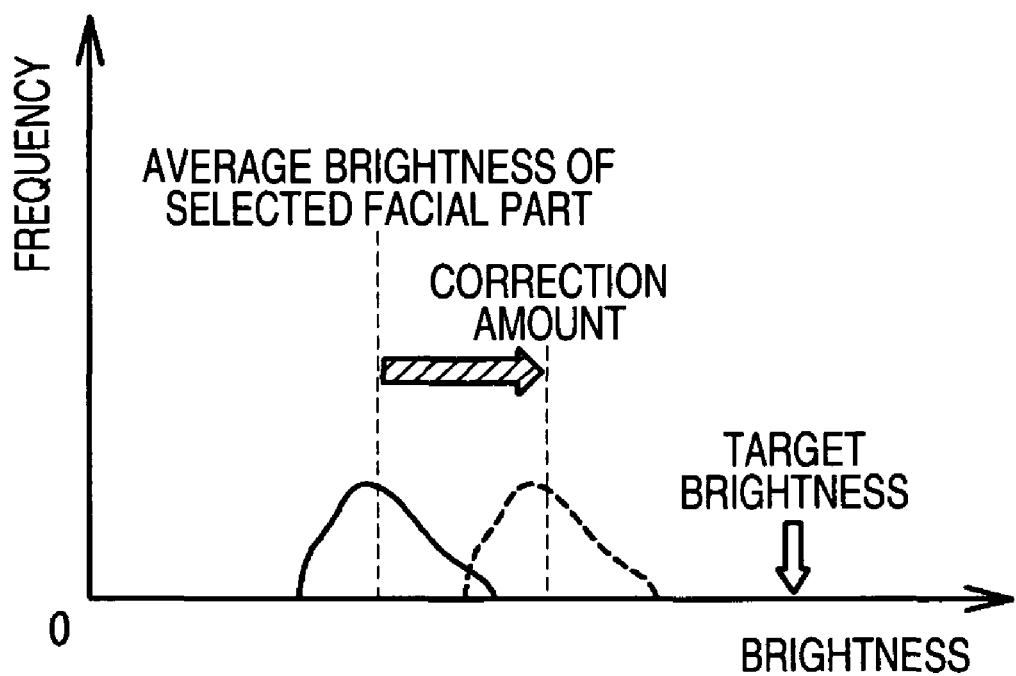
FIG. 14 is a diagram for explaining how to perform the brightness correction.

As shown in FIG. 13, in the brightness correction, first, a target brightness of the facial part is set (step S300). The target brightness may be set in advance as a fixed value, but it is preferred to set the appropriate target brightness depending on the image. The target brightness may be set according to various methods and the following method is one of them. First, an average brightness for the entire image is obtained and then the brightness higher than the average brightness in a prescribed amount (or, prescribed rate) is set as the target brightness. In the image, the human faces readily get attentions of the observer. Accordingly, when the human faces are darker than the neighboring area, determination of the face becomes difficult, and thus it is not preferable. On the contrary, even when the facial part is somewhat brighter than the neighboring area, it does not much give a discomfort feeling. Therefore, by making the facial part brighter then the neighboring area to some extent, a preferable image can be obtained. A white arrow in FIG. 14 shows the target brightness thus set.

Next, the average brightness of the facial part to be obtained is calculated (step S302 in FIG. 13). In FIG. 14, a histogram of the calculated brightness of the facial part to be obtained and the average brightness are shown. When an object in the facial part is definitely a human face, the brightness of the facial part is corrected to be increased by the difference between the average brightness and the target brightness of the facial part, thereby obtaining a preferable image. However, when the object in the facial part is not a human face, the image becomes unnatural.

Figure 15:
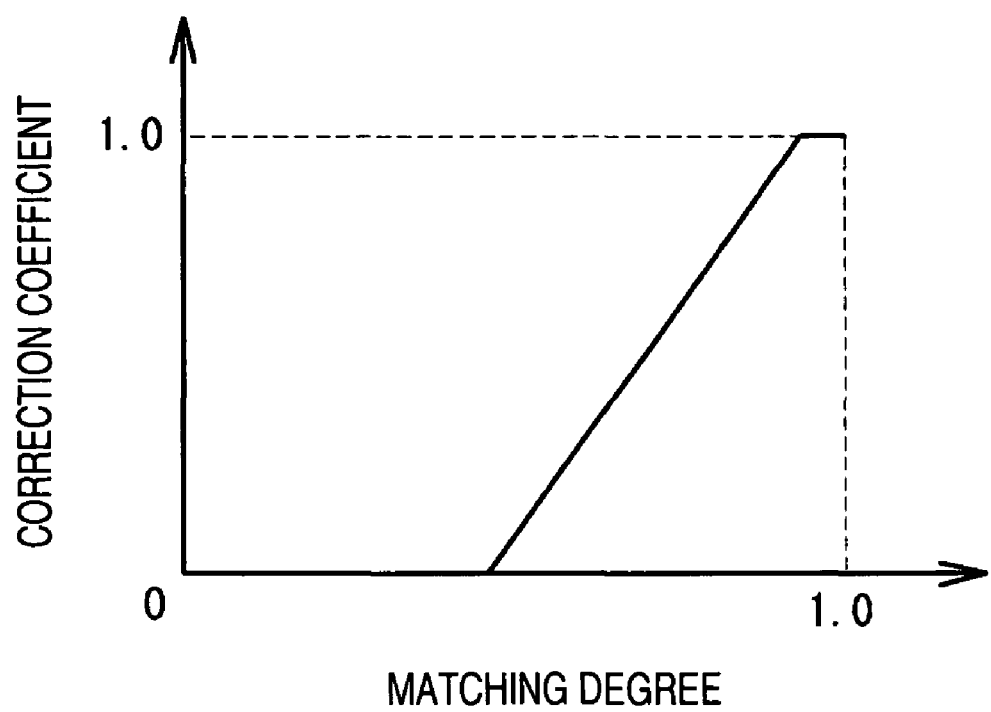
FIG. 15 is a diagram for explaining how to associate a correction coefficient of the brightness correction with the matching degree.

Therefore, based on the target brightness, and the average brightness and the matching degree for the facial part, the correction amount of the brightness is determined (step S304). In the embodiment, a correction coefficient of from 0 to 1 is set in advance in association with the matching degree. The value obtained by subtracting the "average brightness" of the facial part from the "target brightness" is multiplied by the correction coefficient, thereby calculating the correction amount of the brightness. FIG. 15 shows how to associate the correction coefficient with the matching degree.

Accordingly, when the correction amount of the brightness with respect to the matching degree of the facial part is obtained, a processing of correcting the brightness of the facial part by the correction amount of the brightness is performed (step S306). In FIG. 14, the hatched arrow indicates an increase of the histogram of the facial part due to the correction. The histogram of the brightness after the correction is indicated by a dashed line in FIG. 14. As described above, when the brightness of the facial part to be obtained is corrected with reference to the matching degree, the brightness correction described in FIG. 13 is finished and the image data correction in FIG. 11 is performed again.

Next, a processing of correcting hue with respect to the matching degree (hue correction) is executed (step S206 in FIG. 11).

The hue correction can be performed in the same manner as described in the brightness correction. Hereinafter, the hue correction will be briefly described using the flowchart of FIG. 13 with reference to FIG. 16.

Figure 16:
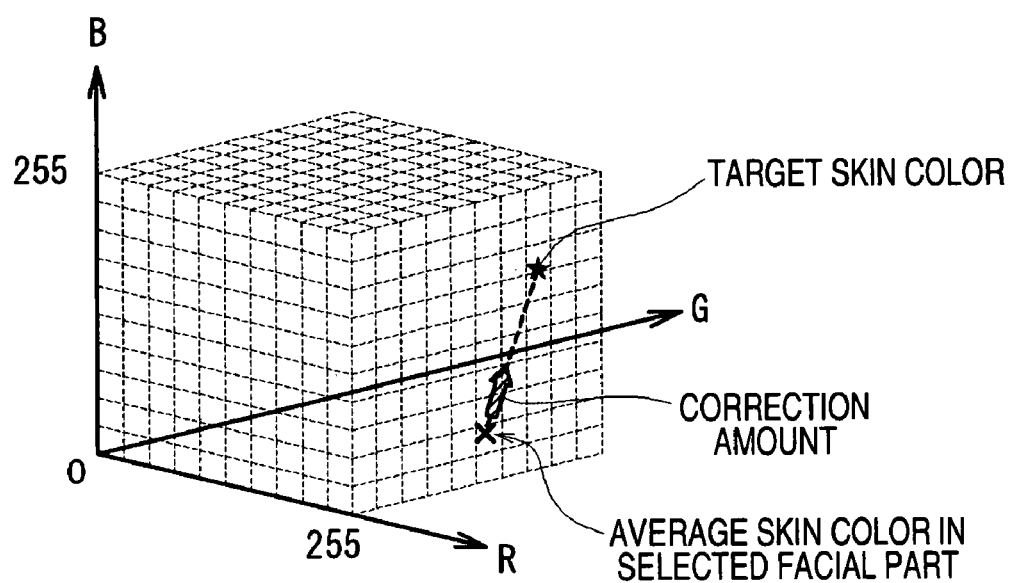
FIG. 16 is a diagram for explaining how to perform a hue correction in the image data correction.

When the hue correction is started, first, a target skin color is set (step S300). Here, the target skin color is set to give the human face a more desirable look. For example, it has generally been known that the image giving a desirable look can be provided by printing the color of the human faces in a more pinkish color than the real color. As described above, there is a preferred skin color for the color of the human faces independently from the real color. Thus, the skin color is obtained in advance and set as the target skin color. In FIG. 16, the target skin color is represented by a "star" mark in an RGB color space.

Next, the average of the colors of the skin (that is, a part which is not the eye or the mouth, and not the hair or the eyebrow) in the facial part to be obtained is obtained and this becomes the average skin color of the facial part (step S302 in FIG. 13). In FIG. 16, the average skin color of the facial part is represented by an "x" mark.

In addition, based on the target skin color, and the average skin color and the matching degree of the facial part, the correction amount of the color is determined (step S304). Such a processing is performed in the same manner as the brightness correction described above. That is, in the facial part having the matching degree of 1.0, the skin color can be corrected to have the target skin color represented in FIG. 16. Therefore, the correction coefficient is set in advance with respect to the matching degree, and the facial part is corrected with the ratio corresponding to the correcting coefficient. A diagonal arrow in FIG. 16 indicates the correction amount thus obtained.

When the correction amount in accordance with the matching degree of the facial part is obtained, a processing of correcting the hue of the facial part is performed (step S306), and then the hue correction is finished. In this embodiment, the hue correction is performed within the RGB color space. However, when the color is corrected within the RGB color space, the brightness is corrected as well. Therefore, like a conversion from the RGB color space to a colorimetric color space (for example, L*a*b* color space), the hue correction may be performed after converting the image data into the image data of the color space in which the brightness and the hue can be separately treated.

Next, it is determined whether all processings described above are performed for all the extracted facial parts (step S208). When it is determined that there is a facial part not processed yet (step S208: No), step S202 is performed again and new facial part is selected, and then a series of processings continued thereafter is performed for this facial part. By repeating such a process, when it determined that processings are performed for all the facial parts (step S208: Yes), the image data correction described in FIG. 11 is finished and the image print processing in FIG. 7 is performed again.

As described above, in this embodiment, when the image data is received, the area considered to include the human face (facial part) in the image is extracted, a prescribed correction is performed for the facial part, and then the image is printed. In addition, for extracting the facial part, the prescribed criterion for determining whether the extracted facial part is actually a human face is stored, the facial part is extracted by comparing with such a criterion, and the matching degree with respect to the criterion is acquired. Further, the facial part is corrected in accordance with the matching degree. Therefore, even when an image which is difficult to determine whether it includes a human face, the correction amount is controlled in accordance with the matching degree. Thus, an inappropriate correction can be avoided. In addition, even when the plurality of human faces are included in the image, it is possible to avoid a case where the corrected face and the non-corrected face are mixed.

In this embodiment, the correction amount is adjusted in accordance with the matching degree for the facial part. However, if the matching degree for the facial part is reflected in the correction, it is preferable, but it may not be necessary to reflect the matching degree in the correction amount. For example, the categories to be corrected may be changed in accordance with the matching degree. Hereinafter, such an image data correction will be described as a second embodiment of the invention with reference to FIG. 17.

This embodiment is different from the image data correction described in FIG. 11 in that whether the hue correction is performed is determined in accordance with the matching degree.

Specifically, when the processing is started in the same manner as the image data correction described above, first, a processing of extracting the facial part and acquiring the matching degree of the facial part is performed (step S400). Next, in the extracted facial part, one facial part to be corrected is selected (step S402).

For the selected facial part, the processing of correcting the brightness in accordance with the matching degree (brightness correction) is performed (step S404). Such a processing is the same as the processing described in FIGS. 13 to 15, and their description will be emitted herein.

When the correction is performed with the brightness, it is determined whether the matching degree of the facial part is higher than a prescribed value (step S406). When the matching degree is higher than the prescribed value (step S406: Yes), the hue correction of the facial part is performed (step S408). Such a processing is also performed in the same manner as the hue correction described in FIG. 16, so that the hue is corrected by adjusting the correction amount in accordance with the matching degree of the facial part. However, in this embodiment, the hue is corrected only when the matching degree of the facial part is higher than the prescribed value.

Thus, the correction amount of the hue may be fixed. Of course, the correction amount may be adjusted in accordance with the matching degree. On the other hand, when the matching degree of the facial part is lower than the prescribed value (step S406: No), the hue correction for the facial part is omitted.

Figure 17:
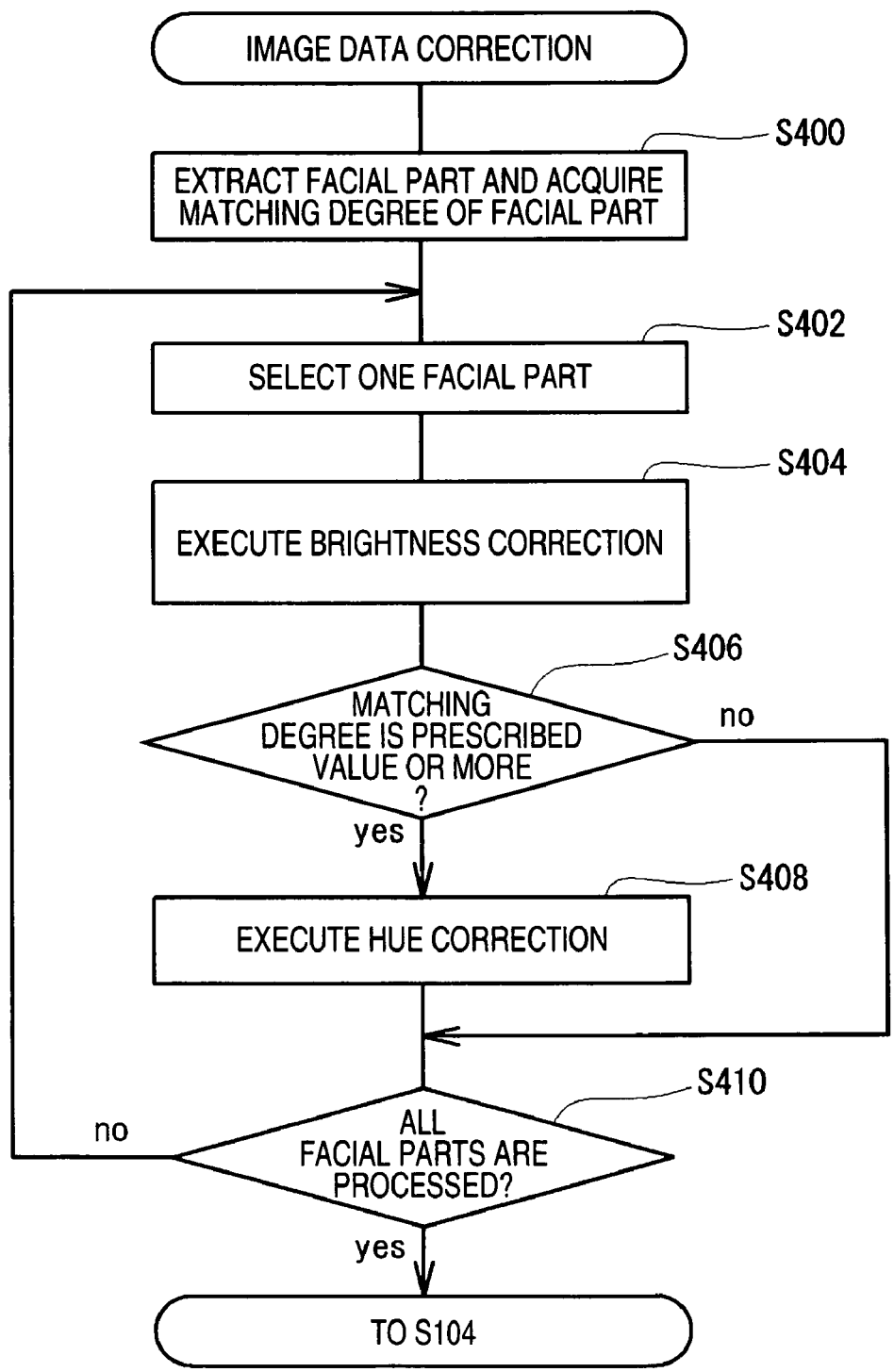
FIG. 17 is a flowchart specifically showing an image data correction performed by a printing apparatus according to a second embodiment of the invention.

Next, for all the extracted facial parts, it is determined whether the processings described above are finished (step S410). When it is determined that there is the facial part which is not processed yet (step S410: No), step S402 is processed again and new facial part is selected, and then a series of processings continued thereafter is performed for this facial part. By repeating such a process, when it determined that processings are performed for all the facial parts (step S410: Yes), the image data correction shown in FIG. 17 is finished and the image print processing in FIG. 7 is performed again.

In this embodiment, when the image data is received, the image data is analyzed to extract the facial part, and the matching degree which is an index of a certainty indicating that the extracted facial part is actually a human face is acquired. When the matching degree of the facial part is higher than the prescribed value (in other words, when it is determined that the extracted facial part is actually a human face with a sufficient certainty), it is corrected for all categories (brightness and hue in the aforementioned example) so that a further preferable image can be printed. On the other hand, the facial part having the matching degree lower than the prescribed value and including the object other than the human face may be erroneously detected as a human face. Even when the facial part is erroneously detected, the categories which do not give an unnatural image (brightness in the above-mentioned example) are also corrected. Therefore, even when an image which it is difficult to determine whether it includes at least one human face, the image can be appropriately printed without being corrected as the unnatural image.

In this embodiment, when the matching degree of the facial part is high so that it is considered that the extracted facial part is a human face with the sufficient certainty, all categories are corrected, and when the matching degree is low, a part of the categories is corrected. However, when the categories to be corrected are appropriately selected in accordance with the matching degree of the facial part, the categories can be selected in any method. For example, a category A (which cannot be expected to significantly improve the image quality, but in which the unnatural image is hardly generated even when it is erroneously corrected) may be corrected for the facial part having a low matching degree, a category B (which can be expected to improve the image quality by a certain degree, but of which the image easily becomes slightly unnatural when it is erroneously corrected) may be corrected for the facial part having an intermediate matching degree, and a category C (which can be expected to significantly improve the image quality, but of which the image becomes unnatural when it is erroneously corrected) may be corrected for the facial part having a high matching degree. Accordingly, the image can be appropriately corrected and printed while providing the human face with a better look and avoiding the unnatural image.

Although only some exemplary embodiments of the invention have been described in detail above, those skilled in the art will readily appreciated that many modifications are possible in the exemplary embodiments without materially departing from the novel teachings and advantages of the invention. Accordingly, all such modifications are intended to be included within the scope of the invention.

For example, in the above embodiments, the image is printed on the printing medium. However, the image may be displayed on a display medium such as a liquid crystal display.

The disclosure of Japanese Patent Application No. 2006-39307 filed Feb. 16, 2006 including specification, drawings and claims is incorporated herein by reference in its entirety.

What is claimed is:

1. A method of processing image data, comprising:
receiving image data obtained by capturing an image;
comparing the image data with a prescribed criterion for judging whether the image includes a prescribed part of a human, and extracting a part of the image that is asserted as a part including the prescribed part of the human with a matching degree with respect to the criterion; and
correcting the extracted part of the image in accordance with the matching degree to obtain corrected image data,
wherein the extracted art of the image includes a plurality of parameters adapted to be corrected,
wherein when the matching degree is higher than a prescribed value, all of the plurality of parameters are corrected, and when the matching degree is lower than the prescribed value, some of the plurality of parameters are corrected,
wherein the prescribed part of the human is a face, and
wherein each of the operations of the method of processing image data is executed by a processor.

2. The method as set forth in claim 1, wherein:
the parameters includes brightness and hue.

3. The method as set forth in claim 2, wherein:
the image data is defined by a first color space; and
the correcting includes converting the image data into converted data defined by a second, colorimetric color space and adapted to be the corrected image data.

4. The method as set forth in claim 1, wherein:
the correcting is performed in a case where the matching degree is greater than or equal to a prescribed value.

5. The method as set forth in claim 1, further comprising:
generating an image based on the corrected image data.

6. An apparatus for processing image data, comprising:
a receiver for receiving image data obtained by capturing an image;
an analyzer for comparing the image data with a prescribed criterion for judging whether the image includes a prescribed part of a human, and to extract a part of the image that is asserted as a part including the prescribed part of the human with a matching degree with respect to the criterion; and
a corrector for correcting the extracted part of the image in accordance with the matching degree to obtain corrected image data,
wherein the extracted art of the image includes a plurality of parameters adapted to be corrected,
wherein when the matching degree is higher than a prescribed value, all of the plurality of parameters are corrected, and when the matching degree is lower than the prescribed value, some of the plurality of parameters are corrected,
wherein the prescribed part of the human is a face, and
wherein each component of the apparatus is executed by a processor.

7. The apparatus as set forth in claim 6, further comprising:
an image generator for generating an image based on the corrected image data.

* * * * *